(12) United States Patent
Nash et al.

(10) Patent No.: US 10,351,160 B2
(45) Date of Patent: Jul. 16, 2019

(54) STEERING COLUMN ASSEMBLY HAVING A SENSOR ASSEMBLY

(71) Applicant: Steering Solutions IP Holding Corporation, Saginaw, MI (US)

(72) Inventors: Richard P. Nash, Frankenmuth, MI (US); Todd M. King, Saginaw, MI (US); Edward A. Cana, Clio, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 132 days.

(21) Appl. No.: 15/364,736

(22) Filed: Nov. 30, 2016

(65) Prior Publication Data
US 2018/0148084 A1 May 31, 2018

(51) Int. Cl.
| | | |
|---|---|---|
| *B62D 1/183* | (2006.01) | |
| *B60Q 9/00* | (2006.01) | |
| *B62D 1/184* | (2006.01) | |
| *F16C 3/03* | (2006.01) | |

(52) U.S. Cl.
CPC ............ *B62D 1/183* (2013.01); *B60Q 9/00* (2013.01); *B62D 1/184* (2013.01); *F16C 3/03* (2013.01); *B60Y 2400/301* (2013.01); *B60Y 2400/3012* (2013.01); *F16C 2326/24* (2013.01)

(58) Field of Classification Search
CPC .............................. B62D 1/183; B62D 1/184
See application file for complete search history.

(56) References Cited

U.S. PATENT DOCUMENTS

| 1,795,567 | A | | 3/1931 | Maurice |
| 3,369,425 | A | | 2/1968 | Runkle et al. |
| 3,386,309 | A | * | 6/1968 | Reed ............... B62D 1/183 180/78 |
| 3,396,600 | A | | 8/1968 | Zeigler et al. |
| 3,782,492 | A | | 1/1974 | Hollins |
| 4,138,167 | A | | 2/1979 | Ernst et al. |
| 4,315,117 | A | | 2/1982 | Kokubo et al. |
| 4,337,967 | A | | 7/1982 | Yoshida et al. |

(Continued)

FOREIGN PATENT DOCUMENTS

| CN | 1449952 A | 10/2003 |
| CN | 1550395 A | 12/2004 |

(Continued)

OTHER PUBLICATIONS

English translation regarding DE102015216326B4, ThyssenKrupp AG; 21 pgs.

(Continued)

*Primary Examiner* — James A English

(57) ABSTRACT

A steering column assembly includes first jacket, a second jacket, and a locking assembly. The first jacket is disposed about a first shaft. The second jacket is at least partially received within the first jacket. The second jacket is disposed about a second shaft that is selectively coupled to the first shaft. The locking assembly includes a shaft sleeve and a sensor assembly. The shaft sleeve is disposed about the first shaft and has a position feature. The sensor assembly is disposed within the second jacket and is operatively connected to a jacket sleeve. The sensor assembly is arranged to detect a position of the position feature relative to the sensor assembly.

20 Claims, 5 Drawing Sheets

(56) References Cited

U.S. PATENT DOCUMENTS

| | | |
|---|---|---|
| 4,476,954 A | 10/1984 | Johnson et al. |
| 4,503,300 A | 3/1985 | Lane, Jr. |
| 4,503,504 A * | 3/1985 | Suzumura ................ B60R 1/07 |
| | | 280/775 |
| 4,509,386 A | 4/1985 | Kimberlin |
| 4,535,645 A | 8/1985 | De Bisschop et al. |
| 4,559,816 A | 12/1985 | Ebert et al. |
| 4,561,323 A | 12/1985 | Stromberg |
| 4,570,776 A | 2/1986 | Iwashita et al. |
| 4,598,604 A | 7/1986 | Sorsche et al. |
| 4,602,520 A | 7/1986 | Nishikawa et al. |
| 4,633,732 A | 1/1987 | Nishikawa et al. |
| 4,661,752 A | 4/1987 | Nishikawa et al. |
| 4,669,325 A | 6/1987 | Nishikawa |
| 4,691,587 A | 9/1987 | Farrand et al. |
| 4,785,684 A | 11/1988 | Nichikawa et al. |
| 4,811,580 A | 3/1989 | Jang |
| 4,836,566 A | 6/1989 | Birsching |
| 4,881,020 A | 11/1989 | Hida et al. |
| 4,893,518 A | 1/1990 | Matsumoto et al. |
| 4,901,544 A | 2/1990 | Jang |
| 4,901,593 A | 2/1990 | Ishikawa |
| 4,921,066 A | 5/1990 | Conley |
| 4,941,679 A | 7/1990 | Baumann et al. |
| 4,943,028 A | 7/1990 | Hoffmann et al. |
| 4,962,570 A | 10/1990 | Hosaka et al. |
| 4,967,618 A | 11/1990 | Matsumoto et al. |
| 4,976,239 A | 12/1990 | Hosaka |
| 5,048,364 A | 9/1991 | Minamoto et al. |
| 5,226,853 A | 7/1993 | Courgeon |
| 5,240,284 A | 8/1993 | Takada et al. |
| 5,295,712 A | 3/1994 | Omura |
| 5,311,432 A | 5/1994 | Momose |
| 5,319,803 A | 6/1994 | Allen |
| 5,428,873 A | 7/1995 | Hitchcock et al. |
| 5,488,555 A | 1/1996 | Asgari et al. |
| 5,590,565 A * | 1/1997 | Palfenier ................ B62D 1/181 |
| | | 74/493 |
| 5,606,892 A | 3/1997 | Hedderly |
| 5,613,404 A | 3/1997 | Lykken et al. |
| 5,618,058 A | 4/1997 | Byon |
| 5,668,721 A | 9/1997 | Chandy |
| 5,678,454 A | 10/1997 | Cartwright et al. |
| 5,690,362 A | 11/1997 | Peitsmeier et al. |
| 5,737,971 A | 4/1998 | Riefe et al. |
| 5,765,116 A | 6/1998 | Wilson-Jones et al. |
| 5,813,699 A | 9/1998 | Donner et al. |
| 5,890,397 A | 4/1999 | Stoner et al. |
| 5,893,580 A | 4/1999 | Hoagland et al. |
| 5,911,789 A | 6/1999 | Keipert et al. |
| 5,931,250 A | 8/1999 | Kagawa et al. |
| 5,941,130 A | 8/1999 | Olgren et al. |
| 6,041,677 A | 3/2000 | Reh et al. |
| 6,070,686 A | 6/2000 | Pollmann |
| 6,079,513 A | 6/2000 | Nishizaki et al. |
| 6,142,523 A | 11/2000 | Bathis |
| 6,170,862 B1 | 1/2001 | Hoagland et al. |
| 6,220,630 B1 | 4/2001 | Sundholm et al. |
| 6,227,571 B1 | 5/2001 | Sheng et al. |
| 6,234,040 B1 | 5/2001 | Weber et al. |
| 6,264,239 B1 | 7/2001 | Link |
| 6,301,534 B1 | 10/2001 | McDermott, Jr. et al. |
| 6,343,993 B1 | 2/2002 | Duval et al. |
| 6,354,622 B1 | 3/2002 | Ulbrich et al. |
| 6,354,626 B1 * | 3/2002 | Cartwright ............ B62D 1/184 |
| | | 280/775 |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,460,427 B1 | 10/2002 | Hedderly |
| 6,571,587 B2 | 6/2003 | Dimig et al. |
| 6,578,449 B1 | 6/2003 | Anspaugh et al. |
| 6,611,745 B1 | 8/2003 | Paul |
| 6,612,198 B2 | 9/2003 | Rouleau et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,025,380 B2 | 4/2006 | Arihara |
| 7,048,305 B2 | 5/2006 | Muller |
| 7,062,365 B1 | 6/2006 | Fei |
| 7,140,213 B2 | 11/2006 | Feucht et al. |
| 7,159,904 B2 | 1/2007 | Schafer et al. |
| 7,213,842 B2 | 5/2007 | Uehle et al. |
| 7,258,365 B2 | 8/2007 | Kahlenberg et al. |
| 7,261,014 B2 | 8/2007 | Arihara |
| 7,290,800 B2 | 11/2007 | Schwarzbich et al. |
| 7,295,904 B2 | 11/2007 | Kanevsky et al. |
| 7,308,964 B2 | 12/2007 | Hara et al. |
| 7,410,190 B2 | 8/2008 | Sawada et al. |
| 7,428,944 B2 | 9/2008 | Gerum |
| 7,461,863 B2 | 12/2008 | Muller |
| 7,495,584 B1 | 2/2009 | Sorensen |
| 7,533,594 B2 | 5/2009 | Menjak et al. |
| 7,628,244 B2 | 12/2009 | Chino et al. |
| 7,719,431 B2 | 5/2010 | Bolourchi |
| 7,735,405 B2 | 6/2010 | Parks |
| 7,758,073 B1 | 7/2010 | Chou |
| 7,775,129 B2 | 8/2010 | Oike et al. |
| 7,784,830 B2 * | 8/2010 | Ulintz ................ B62D 1/192 |
| | | 280/775 |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 7,913,803 B2 | 3/2011 | Hidaka |
| 7,975,569 B2 * | 7/2011 | Klos ................ B62D 1/185 |
| | | 280/777 |
| 8,002,075 B2 | 8/2011 | Markfort |
| 8,011,265 B2 | 9/2011 | Menjak et al. |
| 8,021,235 B2 | 9/2011 | Tinnin et al. |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,161,839 B2 | 4/2012 | Warashina |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,466,382 B2 | 6/2013 | Donicke |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,733,201 B2 | 5/2014 | Okano et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,955,407 B2 * | 2/2015 | Sakuma ................ B62D 1/185 |
| | | 280/777 |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,039,041 B2 | 5/2015 | Buzzard et al. |
| 9,045,078 B2 | 6/2015 | Tovar et al. |
| 9,073,574 B2 | 7/2015 | Cuddihy et al. |
| 9,080,895 B2 | 7/2015 | Martin et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |

(56) References Cited

U.S. PATENT DOCUMENTS

| | | | |
|---|---|---|---|
| 9,150,224 B2 | 10/2015 | Yopp | |
| 9,164,619 B2 | 10/2015 | Goodlein | |
| 9,174,642 B2 | 11/2015 | Wimmer et al. | |
| 9,186,994 B2 | 11/2015 | Okuyama et al. | |
| 9,193,375 B2 | 11/2015 | Schramm et al. | |
| 9,199,553 B2 | 12/2015 | Cuddihy et al. | |
| 9,227,531 B2 | 1/2016 | Cuddihy et al. | |
| 9,233,638 B2 | 1/2016 | Lisseman et al. | |
| 9,235,111 B2 | 1/2016 | Davidsson et al. | |
| 9,235,211 B2 | 1/2016 | Davidsson et al. | |
| 9,235,987 B2 | 1/2016 | Green et al. | |
| 9,238,409 B2 | 1/2016 | Lathrop et al. | |
| 9,248,743 B2 | 2/2016 | Enthaler et al. | |
| 9,260,130 B2 | 2/2016 | Mizuno | |
| 9,290,174 B1 | 3/2016 | Zagorski | |
| 9,290,201 B1 | 3/2016 | Lombrozo | |
| 9,296,410 B2 | 3/2016 | Isogai et al. | |
| 9,298,184 B2 | 3/2016 | Bartels et al. | |
| 9,308,857 B2 | 4/2016 | Lisseman et al. | |
| 9,308,891 B2 | 4/2016 | Cudak et al. | |
| 9,333,983 B2 | 5/2016 | Lathrop et al. | |
| 9,352,752 B2 | 5/2016 | Cullinane et al. | |
| 9,360,108 B2 | 6/2016 | Pfenninger et al. | |
| 9,360,865 B2 | 6/2016 | Yopp | |
| 9,421,994 B2 | 8/2016 | Agbor et al. | |
| 9,487,228 B2 | 11/2016 | Febre et al. | |
| 9,550,514 B2 | 1/2017 | Schulz et al. | |
| 9,616,914 B2 | 4/2017 | Stinebring et al. | |
| 9,643,641 B1 | 5/2017 | Stinebring et al. | |
| 9,663,136 B2 | 5/2017 | Stinebring et al. | |
| 9,744,983 B2 | 8/2017 | Stinebring et al. | |
| 9,828,016 B2 | 11/2017 | Lubischer | |
| 9,845,106 B2 | 12/2017 | Bodtker | |
| 9,849,904 B2 | 12/2017 | Rouleau | |
| 9,852,752 B1 | 12/2017 | Chou et al. | |
| 9,862,403 B1 | 1/2018 | Rouleau et al. | |
| 9,919,724 B2 | 3/2018 | Lubischer et al. | |
| 10,065,655 B2 | 9/2018 | Bendewald et al. | |
| 2002/0171235 A1 | 11/2002 | Riefe et al. | |
| 2003/0046012 A1 | 3/2003 | Yamaguchi | |
| 2003/0094330 A1 | 5/2003 | Boloorchi et al. | |
| 2003/0146037 A1 | 8/2003 | Menjak et al. | |
| 2003/0183440 A1 | 10/2003 | Thomas et al. | |
| 2003/0188598 A1 | 10/2003 | Cartwright | |
| 2003/0227159 A1 | 12/2003 | Muller | |
| 2004/0016588 A1 | 1/2004 | Vitale et al. | |
| 2004/0046346 A1 | 3/2004 | Eki et al. | |
| 2004/0046379 A1 | 3/2004 | Riefe | |
| 2004/0099083 A1 | 5/2004 | Choi et al. | |
| 2004/0099468 A1 | 5/2004 | Chernoff et al. | |
| 2004/0129098 A1 | 7/2004 | Gayer et al. | |
| 2004/0204808 A1 | 10/2004 | Satoh et al. | |
| 2004/0262063 A1 | 12/2004 | Kaufmann et al. | |
| 2005/0001445 A1 | 1/2005 | Ercolano | |
| 2005/0081675 A1 | 4/2005 | Oshita et al. | |
| 2005/0197746 A1 | 9/2005 | Pelchen et al. | |
| 2005/0242562 A1 | 11/2005 | Ridgway et al. | |
| 2005/0263996 A1 | 12/2005 | Manwaring et al. | |
| 2005/0275205 A1 | 12/2005 | Ahnafield | |
| 2006/0005658 A1 | 1/2006 | Armstrong et al. | |
| 2006/0186658 A1 | 8/2006 | Yasuhara et al. | |
| 2006/0202463 A1 | 9/2006 | Schwarzbich et al. | |
| 2006/0219499 A1 | 10/2006 | Organek | |
| 2006/0224287 A1 | 10/2006 | Izawa et al. | |
| 2006/0237959 A1 | 10/2006 | Dimig et al. | |
| 2006/0244251 A1 | 11/2006 | Muller | |
| 2006/0283281 A1 | 12/2006 | Li et al. | |
| 2007/0021889 A1 | 1/2007 | Tsuchiya | |
| 2007/0029771 A1 | 2/2007 | Haglund et al. | |
| 2007/0046003 A1 | 3/2007 | Mori et al. | |
| 2007/0046013 A1 | 3/2007 | Bito | |
| 2007/0096446 A1 | 5/2007 | Breed | |
| 2007/0126222 A1 | 6/2007 | Koya et al. | |
| 2007/0158116 A1 | 7/2007 | Peppler | |
| 2007/0241548 A1 | 10/2007 | Fong | |
| 2007/0284867 A1 | 12/2007 | Cymbal et al. | |
| 2008/0009986 A1 | 1/2008 | Lu et al. | |
| 2008/0028884 A1 | 2/2008 | Monash | |
| 2008/0047382 A1 | 2/2008 | Tomaru et al. | |
| 2008/0079253 A1 | 4/2008 | Sekii et al. | |
| 2008/0147276 A1 | 6/2008 | Pattok et al. | |
| 2008/0216597 A1 | 9/2008 | Iwakawa et al. | |
| 2008/0238068 A1 | 10/2008 | Kumar et al. | |
| 2008/0264196 A1 | 10/2008 | Schindler et al. | |
| 2009/0024278 A1 | 1/2009 | Kondo et al. | |
| 2009/0056493 A1 | 3/2009 | Dubay et al. | |
| 2009/0107284 A1* | 4/2009 | Lucas | B60N 2/24 74/495 |
| 2009/0229400 A1 | 9/2009 | Ozsoylu et al. | |
| 2009/0256342 A1 | 10/2009 | Cymbal et al. | |
| 2009/0266195 A1 | 10/2009 | Tanke et al. | |
| 2009/0276111 A1 | 11/2009 | Wang et al. | |
| 2009/0280914 A1 | 11/2009 | Kakutani et al. | |
| 2009/0292466 A1 | 11/2009 | McCarthy et al. | |
| 2010/0152952 A1 | 6/2010 | Lee et al. | |
| 2010/0218637 A1 | 9/2010 | Barroso | |
| 2010/0222976 A1 | 9/2010 | Haug | |
| 2010/0228417 A1 | 9/2010 | Lee et al. | |
| 2010/0228438 A1 | 9/2010 | Buerkle | |
| 2010/0280713 A1 | 11/2010 | Stahlin et al. | |
| 2010/0286869 A1 | 11/2010 | Katch et al. | |
| 2010/0288567 A1 | 11/2010 | Bonne | |
| 2011/0098922 A1 | 4/2011 | Ibrahim | |
| 2011/0153160 A1 | 6/2011 | Hesseling et al. | |
| 2011/0167940 A1 | 7/2011 | Shavrnoch et al. | |
| 2011/0187518 A1 | 8/2011 | Strumolo et al. | |
| 2011/0266396 A1 | 11/2011 | Abildgaard et al. | |
| 2011/0282550 A1 | 11/2011 | Tada et al. | |
| 2011/0314954 A1 | 12/2011 | Matsuno et al. | |
| 2012/0136540 A1 | 5/2012 | Miller | |
| 2012/0205183 A1 | 8/2012 | Rombold | |
| 2012/0209473 A1 | 8/2012 | Birsching et al. | |
| 2012/0215377 A1 | 8/2012 | Takemura et al. | |
| 2012/0247259 A1 | 10/2012 | Mizuno et al. | |
| 2012/0287050 A1 | 11/2012 | Wu | |
| 2013/0002416 A1 | 1/2013 | Gazit | |
| 2013/0087006 A1 | 4/2013 | Ohtsubo et al. | |
| 2013/0104689 A1 | 5/2013 | Marutani et al. | |
| 2013/0133463 A1 | 5/2013 | Moriyama | |
| 2013/0158771 A1 | 6/2013 | Kaufmann | |
| 2013/0174686 A1 | 7/2013 | Hirche et al. | |
| 2013/0199866 A1 | 8/2013 | Yamamoto et al. | |
| 2013/0205933 A1 | 8/2013 | Moriyama | |
| 2013/0218396 A1 | 8/2013 | Moshchuk et al. | |
| 2013/0233117 A1 | 9/2013 | Read et al. | |
| 2013/0292955 A1 | 11/2013 | Higgins et al. | |
| 2013/0325202 A1 | 12/2013 | Howard et al. | |
| 2013/0325264 A1 | 12/2013 | Alcazar et al. | |
| 2014/0028008 A1 | 1/2014 | Stadler et al. | |
| 2014/0046542 A1 | 2/2014 | Kauffman et al. | |
| 2014/0046547 A1 | 2/2014 | Kauffman et al. | |
| 2014/0111324 A1 | 4/2014 | Lisseman et al. | |
| 2014/0116187 A1 | 5/2014 | Tinnin | |
| 2014/0137694 A1 | 5/2014 | Sugiura | |
| 2014/0277896 A1 | 9/2014 | Lathrop et al. | |
| 2014/0300479 A1 | 10/2014 | Wolter et al. | |
| 2014/0309816 A1 | 10/2014 | Stefan et al. | |
| 2015/0002404 A1 | 1/2015 | Hooton | |
| 2015/0014086 A1 | 1/2015 | Eisenbarth | |
| 2015/0032322 A1 | 1/2015 | Wimmer | |
| 2015/0051780 A1 | 2/2015 | Hahne | |
| 2015/0060185 A1 | 3/2015 | Feguri | |
| 2015/0120142 A1 | 4/2015 | Park et al. | |
| 2015/0137492 A1 | 5/2015 | Rao et al. | |
| 2015/0203145 A1 | 7/2015 | Sugiura et al. | |
| 2015/0203149 A1 | 7/2015 | Katayama et al. | |
| 2015/0210273 A1 | 7/2015 | Kaufmann et al. | |
| 2015/0246673 A1 | 9/2015 | Tseng et al. | |
| 2015/0251666 A1 | 9/2015 | Attard et al. | |
| 2015/0283998 A1 | 10/2015 | Lind et al. | |
| 2015/0324111 A1 | 11/2015 | Jubner et al. | |
| 2015/0375769 A1 | 12/2015 | Abboud et al. | |
| 2016/0009332 A1 | 1/2016 | Sirbu | |

(56) References Cited

U.S. PATENT DOCUMENTS

| | | | |
|---|---|---|---|
| 2016/0016604 A1* | 1/2016 | Johta | B62D 1/184 |
| | | | 744/493 |
| 2016/0075371 A1 | 3/2016 | Varunkikar et al. | |
| 2016/0082867 A1 | 3/2016 | Sugioka et al. | |
| 2016/0114828 A1 | 4/2016 | Tanaka et al. | |
| 2016/0185387 A1 | 6/2016 | Kuoch | |
| 2016/0200246 A1 | 7/2016 | Lisseman et al. | |
| 2016/0200343 A1 | 7/2016 | Lisseman et al. | |
| 2016/0200344 A1 | 7/2016 | Sugioka et al. | |
| 2016/0207538 A1 | 7/2016 | Urano et al. | |
| 2016/0209841 A1 | 7/2016 | Yamaoka et al. | |
| 2016/0229450 A1 | 8/2016 | Basting et al. | |
| 2016/0231743 A1 | 8/2016 | Bendewald et al. | |
| 2016/0244070 A1* | 8/2016 | Bendewald | B60W 50/08 |
| 2016/0244086 A1 | 8/2016 | Moriyama | |
| 2016/0252133 A1 | 9/2016 | Caverly | |
| 2016/0318540 A1 | 11/2016 | King | |
| 2016/0318542 A1 | 11/2016 | Pattok et al. | |
| 2016/0347347 A1 | 12/2016 | Lubischer | |
| 2016/0347348 A1 | 12/2016 | Lubischer | |
| 2016/0362084 A1 | 12/2016 | Martin et al. | |
| 2016/0362117 A1 | 12/2016 | Kaufmann et al. | |
| 2016/0362126 A1 | 12/2016 | Lubischer | |
| 2016/0368522 A1 | 12/2016 | Lubischer | |
| 2016/0375770 A1 | 12/2016 | Ryne et al. | |
| 2016/0375860 A1 | 12/2016 | Lubischer | |
| 2016/0375923 A1 | 12/2016 | Schulz | |
| 2016/0375925 A1 | 12/2016 | Lubischer et al. | |
| 2016/0375926 A1 | 12/2016 | Lubischer et al. | |
| 2016/0375927 A1 | 12/2016 | Schulz | |
| 2016/0375928 A1 | 12/2016 | Magnus | |
| 2016/0375929 A1 | 12/2016 | Rouleau | |
| 2016/0375931 A1 | 12/2016 | Lubischer | |
| 2017/0029009 A1 | 2/2017 | Rouleau | |
| 2017/0029018 A1 | 2/2017 | Lubischer | |
| 2017/0097071 A1 | 4/2017 | Galehr | |
| 2017/0106894 A1 | 4/2017 | Bodtker | |
| 2017/0106895 A1 | 4/2017 | Jager et al. | |
| 2017/0113589 A1 | 4/2017 | Riefe | |
| 2017/0113712 A1 | 4/2017 | Watz | |
| 2017/0151975 A1* | 6/2017 | Schmidt | B62D 1/181 |
| 2017/0294120 A1 | 10/2017 | Ootsuji | |
| 2017/0297606 A1 | 10/2017 | Kim et al. | |
| 2017/0361863 A1 | 12/2017 | Rouleau | |
| 2017/0369091 A1* | 12/2017 | Nash | B62D 1/181 |
| 2018/0029628 A1 | 2/2018 | Sugishita | |
| 2018/0050720 A1 | 2/2018 | King et al. | |
| 2018/0072339 A1* | 3/2018 | Bodtker | B62D 1/183 |
| 2018/0079441 A1 | 3/2018 | McKinzie et al. | |
| 2018/0086378 A1 | 3/2018 | Bell et al. | |
| 2018/0111639 A1 | 4/2018 | Bodtker et al. | |
| 2018/0154932 A1 | 6/2018 | Rakouth et al. | |
| 2018/0229753 A1 | 8/2018 | Magnus et al. | |
| 2018/0251147 A1 | 9/2018 | Heitz et al. | |
| 2018/0273081 A1 | 9/2018 | Lubischer et al. | |
| 2018/0319367 A1 | 11/2018 | Ting | |
| 2019/0002010 A1 | 1/2019 | Cao et al. | |

FOREIGN PATENT DOCUMENTS

| | | |
|---|---|---|
| CN | 1722030 | 1/2006 |
| CN | 1736786 | 2/2006 |
| CN | 101037117 | 9/2007 |
| CN | 101041355 | 9/2007 |
| CN | 101049814 A | 10/2007 |
| CN | 101291840 A | 10/2008 |
| CN | 101402320 A | 4/2009 |
| CN | 101596903 | 12/2009 |
| CN | 201534560 U | 7/2010 |
| CN | 101954862 A | 1/2011 |
| CN | 102120466 A | 7/2011 |
| CN | 102161346 A | 8/2011 |
| CN | 102452391 | 5/2012 |
| CN | 102452411 A | 5/2012 |
| CN | 102498025 A | 6/2012 |
| CN | 102523738 A | 6/2012 |
| CN | 102574545 B | 7/2012 |
| CN | 202337282 U | 7/2012 |
| CN | 102806937 A | 12/2012 |
| CN | 103085854 A | 5/2013 |
| CN | 103129599 A | 6/2013 |
| CN | 103419840 | 12/2013 |
| CN | 103448785 A | 12/2013 |
| CN | 103569185 A | 2/2014 |
| CN | 103587571 A | 2/2014 |
| CN | 203793405 U | 8/2014 |
| CN | 204222957 U | 3/2015 |
| CN | 104755346 A | 7/2015 |
| DE | 4310431 A1 | 10/1994 |
| DE | 19523214 A1 | 1/1997 |
| DE | 19923012 | 11/2000 |
| DE | 19954505 A1 | 5/2001 |
| DE | 10212782 A1 | 10/2003 |
| DE | 102005032528 | 1/2007 |
| DE | 102005056438 A1 | 6/2007 |
| DE | 102006025254 | 12/2007 |
| DE | 102010025197 A1 | 12/2011 |
| DE | 1020081057313 A1 | 12/2011 |
| DE | 102013110865 A1 | 4/2015 |
| DE | 102015216326 B4 | 9/2016 |
| EP | 1559630 A2 | 8/2005 |
| EP | 1783719 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 | 5/2005 |
| FR | 3016327 A1 | 7/2015 |
| JP | S58191668 A | 11/1983 |
| JP | S60157963 A | 8/1985 |
| JP | H05162652 | 6/1993 |
| JP | 2006143117 A | 6/2006 |
| JP | 2007253809 A | 10/2007 |
| JP | 2012201334 A | 10/2012 |
| KR | 2100063433 A | 6/2010 |
| KR | 101062339 B1 | 9/2011 |
| KR | 20150010435 A | 1/2015 |
| WO | 2006099483 A1 | 9/2006 |
| WO | 2010082394 A1 | 7/2010 |
| WO | 2010116518 | 10/2010 |
| WO | 2014208573 A1 | 12/2014 |

OTHER PUBLICATIONS

China Patent Application No. 201510204221.5 Second Office Action dated Mar. 10, 2018, 8 pages.
CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.

(56) References Cited

OTHER PUBLICATIONS

European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Office Action dated Aug. 29, 2016.
Partial European Search Report for related European Patent Application No. 14156903.8, dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
Chinese Office Action & Search Report for Chinese Application No. 201610427896.0 dated Oct. 27, 2017, 16 pages, English Translation Included.
Chinese Office Action & Search Report for Chinese Application No. 201610609647.3 dated Mar. 12, 2018, 5 pages, no English translation available.
Chinese Office Action & Search Report for Chinese Application No. 201610620335.2 dated Jan. 22, 2018, 15 pages, English Translation Included.
Chinese Office Action & Search Report for Chinese Application No. 201610642300.9 dated Feb. 7, 2018, 22 pages, English Translation Only.
Chinese Office Action & Search Report for Chinese Application No. 201610651953.3 dated Jan. 25, 2018, 12 pages, English Translation Included.
Chinese Office Action & Search Report for Chinese Application No. 201610830808.1 dated Apr. 3, 2018, 30 pages, English Translation Included.
Chinese Office Action & Search Report for Chinese Application No. 201610830809.6 dated Mar. 12, 2018, 11 pages, English Translation Included.
Chinese Office Action & Search Report for Chinese Application No. 201610830810.9 dated Jan. 31, 2018, 18 pages, English Translation Included.
Chinese Office Action & Search Report for Chinese Application No. 201611113746.9 dated May 4, 2018, 11 pages, English Translation Included.
Chinese Office Action for Chinese Application No. 201610427896.0 dated May 28, 2018 16 pages, English Translation Included.
CN Chinese Office Action & Search Report for Chinese Application No. 201610620335.2 dated Aug. 7, 2018, 16 pages, English Translation Included.

\* cited by examiner

STEERING COLUMN ASSEMBLY HAVING A SENSOR ASSEMBLY

BACKGROUND OF THE INVENTION

Autonomous driving assisted steering systems are being developed that are configured to steer a vehicle in certain circumstances without driver intervention. Responsibility to steer the vehicle may be transferred from the driver of the vehicle to the autonomous driving assisted steering system.

SUMMARY OF THE INVENTION

According to an embodiment of the present disclosure, a steering assembly is provided. The steering assembly is provided with an autonomous or semi-autonomous vehicle. The steering assembly includes a steering column assembly and a locking assembly. The steering column assembly is movable between a stowed position and an un-stowed position. The steering column assembly includes a first shaft and a second shaft. The first shaft is at least partially received within a first jacket. The second shaft is at least partially received within a second jacket. The second shaft is selectively coupled to the first shaft. The locking assembly is received within at least one of the first jacket and the second jacket. The locking assembly is arranged to selectively decouple the first shaft from the second shaft in response to the steering column assembly moving from the un-stowed position towards the stowed position.

According to another embodiment of the present disclosure, a steering column assembly is provided. The steering column assembly includes a first jacket, a second jacket, and a locking assembly. The first jacket is disposed about a first shaft. The second jacket is at least partially received within the first jacket. The second jacket is disposed about a second shaft that is selectively coupled to the first shaft. The locking assembly includes a shaft sleeve and a sensor assembly. The shaft sleeve is disposed about the first shaft and has a position feature. The sensor assembly is disposed within the second jacket and is operatively connected to a jacket sleeve. The sensor assembly is arranged to detect a position of the position feature relative to the sensor assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1-4, a vehicle such as an autonomous vehicle, an autonomously driven vehicle, a selectively autonomous vehicle, or a semi-autonomous vehicle that is provided with an autonomous driving assisted steering system (ADAS) 10 that is in communication with a steering assembly 12. The ADAS 10 is configured to selectively operate the vehicle such that the vehicle is able to perform operations without continuous input from a driver (e.g. steering, accelerating, braking, maneuvering, etc.). The ADAS 10 enables the vehicle and the steering assembly 12 to be at least partially autonomously controlled using sensing, steering, and/or braking technology. A driver of the vehicle is able to selectively activate or deactivate the ADAS 10 via a switch or other mechanism. A vehicle control or monitoring system is able to selectively activate or deactivate the ADAS in response to events occurring within or external to the vehicle.

Figure 1:
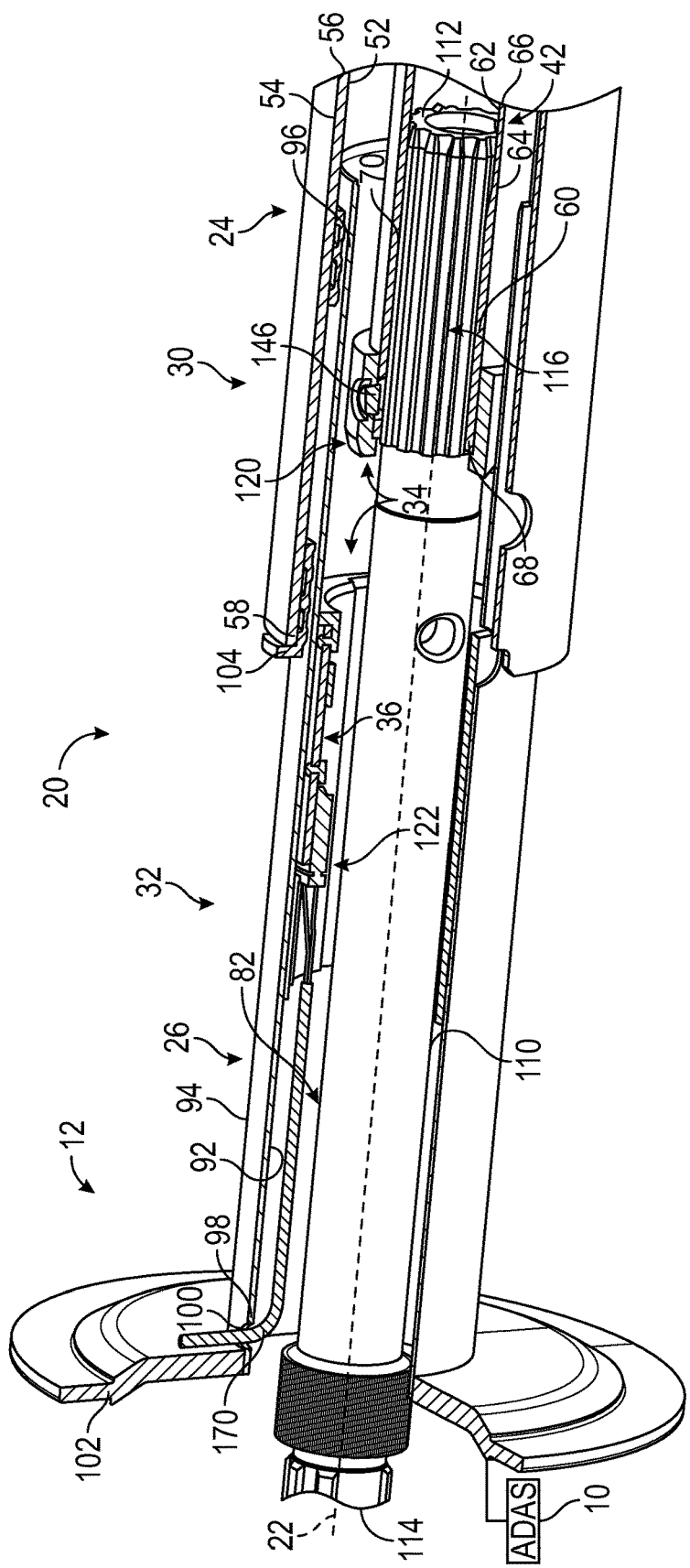
FIG. 1 is a partial cross-sectional view of a steering assembly in an un-stowed position.
Figure 2:
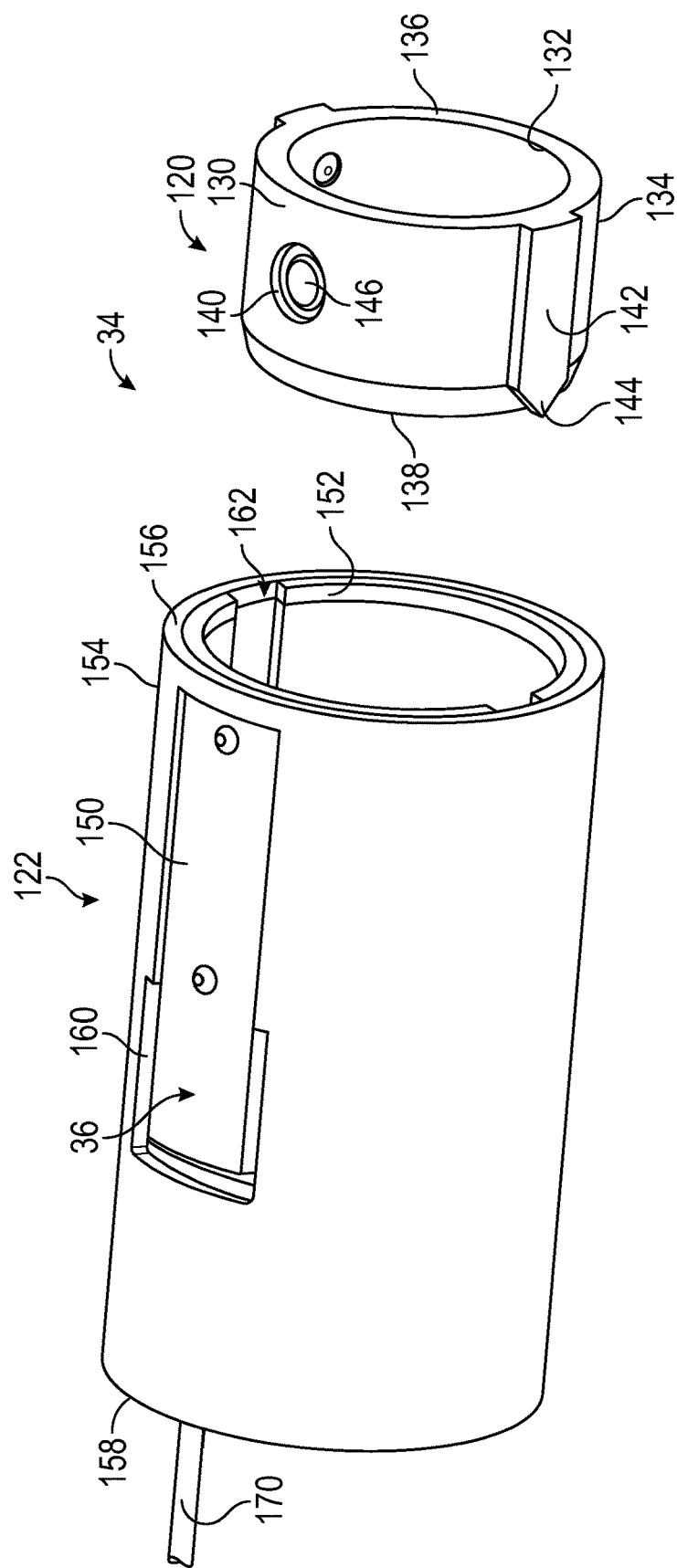
FIG. 2 is a perspective view of a locking assembly provided with the steering assembly in the un-stowed position.
Figure 3:
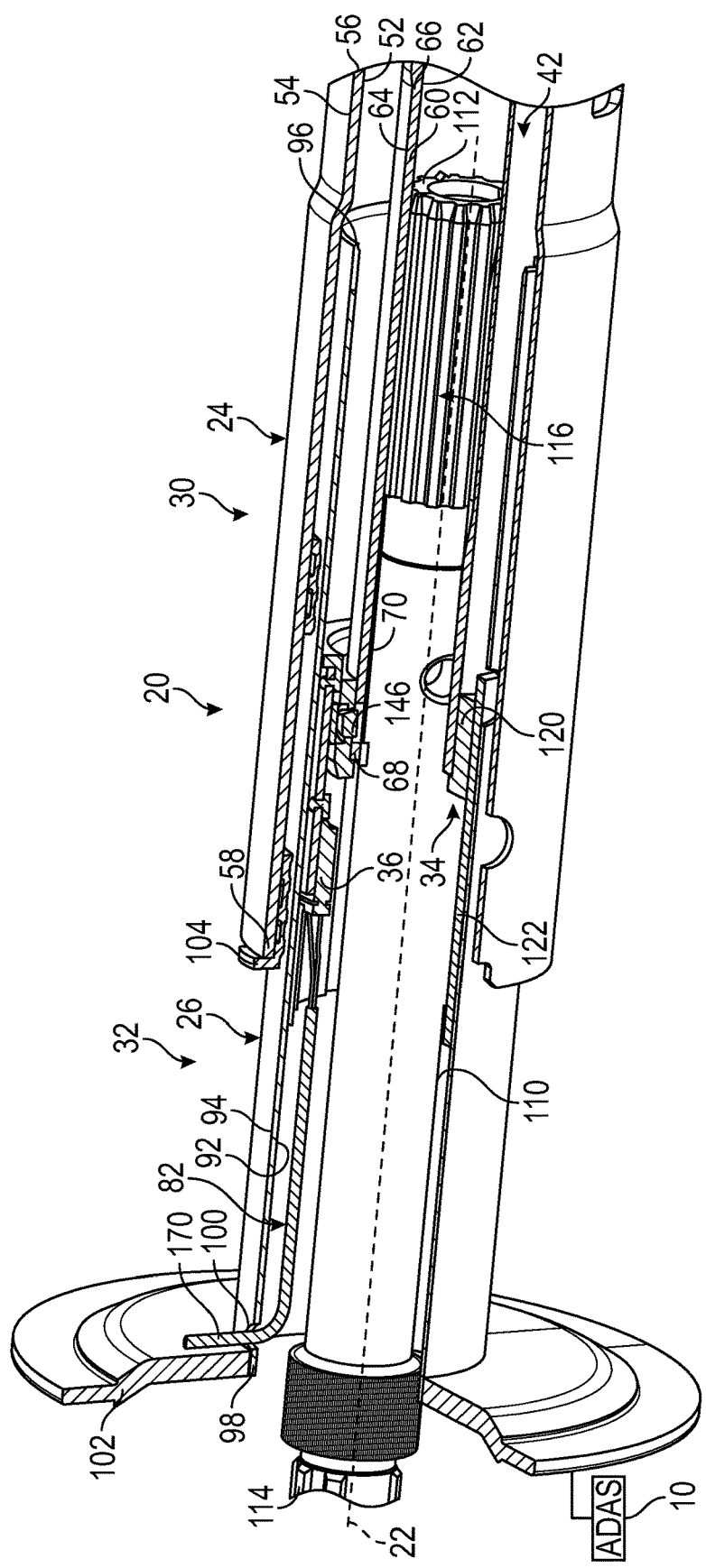
FIG. 3 is a partial cross-sectional view of the steering assembly in a stowed position.

The steering assembly 12 includes a steering column assembly 20 that is movable between an extended position (un-stowed position), as shown in FIG. 1, and a retracted position (stowed position), as shown in FIG. 3, based on the state of the ADAS 10. A steering wheel that is operatively connected to the steering column assembly 20 is in the extended position (un-stowed position) while the ADAS 10 is deactivated. The extended position (un-stowed position) may correspond to a position in which a driver of the vehicle may be able to provide a steering input to the steering assembly 12 via the steering wheel. The un-stowed position may also correspond to a position in which the steering wheel that is operatively connected to the steering column assembly 20 is moving towards the retracted position (stowed position). The steering wheel that is operatively connected to the steering column assembly 20 moves from the extended position (un-stowed position) towards the retracted position (stowed position) in response to activation of the ADAS 10. The retracted position (stowed position) may correspond to a position in which the driver of the vehicle may be restricted from providing a steering input to the steering assembly 12 via the steering wheel.

Referring to FIGS. 1 and 3, the steering column assembly 20 extends along a steering column axis 22. The steering column assembly 20 includes a first jacket 24, a second jacket 26, a first shaft assembly 30, a second shaft assembly 32, a locking assembly 34, and a sensor assembly 36.

The first shaft assembly 30 extends along the steering column axis 22. The first shaft assembly 30 is operatively connected to the steering wheel. The first shaft assembly 30 is movable relative to the second shaft assembly 32.

The first jacket 24 includes a first jacket inner surface 52 that is disposed opposite a first jacket outer surface 54. The first jacket inner surface 52 and the first jacket outer surface 54 each extend between a first jacket first end 56 and a first jacket second end 58 along the steering column axis 22.

The first shaft 42 is at least partially received within the first jacket 24. The first shaft 42 is spaced apart from the first jacket inner surface 52.

The first shaft 42 includes a first shaft body 60 having a first shaft inner surface 62 that is disposed opposite the first shaft outer surface 64. The first shaft inner surface 62 and the first shaft outer surface 64 each extend between a first shaft first end 66 and a first shaft second end 68 along the steering column axis 22.

The first shaft inner surface 62 defines or is provided with a plurality of first engagement elements 70. The plurality of first engagement elements 70 may be an internal spline that is disposed proximate the first shaft second end 68 and extend towards the first shaft first end 66.

The second shaft assembly 32 extends along the steering column axis 22 and is at least partially received within the first shaft assembly 30. The second shaft assembly 32 is selectively coupled to the first shaft assembly 30 based on the operational state of the ADAS 10 and/or whether the steering column assembly 20 is in the stowed position or the un-stowed position.

The second jacket 26 includes a second jacket inner surface 92 that is disposed opposite a second jacket outer surface 94. The second jacket inner surface 92 and the second jacket outer surface 94 each extend between a second jacket first end 96 and a second jacket second end 98 along the steering column axis 22.

The second jacket 26 defines an opening 100 that extends from the second jacket outer surface 94 to the second jacket inner surface 92. The opening 100 is disposed proximate the second jacket second end 98.

The second jacket 26 is operatively connected to a steering plate 102. The second jacket second end 98 abuts the steering plate 102.

The second jacket 26 is at least partially received within the first jacket 24. The second jacket outer surface 94 is spaced apart from the first jacket inner surface 52. The second jacket 26 is at least partially disposed about the first shaft 42 such that the first shaft 42 is received at least partially within the second jacket 26.

A bushing 104 is provided and disposed between the first jacket 24 and the second jacket 26. The bushing 104 is arranged to facilitate the translation of the first jacket 24 relative to the second jacket 26 along the steering column axis 22. The bushing 104 is disposed between the first jacket inner surface 52 and the second jacket outer surface 94 proximate the first jacket second end 58. In at least one embodiment, multiple bushings may be provided at various locations between the first jacket inner surface 52 and the second jacket outer surface 94.

The second shaft 82 is at least partially received within the second jacket 26. The second shaft 82 is selectively coupled to the first shaft 42. The first shaft 42 is movable relative to the second shaft 82.

The second shaft 82 includes a second shaft outer surface 110. The second shaft outer surface 110 extends between a second shaft first end 112 and a second shaft second end 114 along the steering column axis 22. The second shaft outer surface 110 defines or is provided with a plurality of second engagement elements 116. The plurality of second engagement elements 116 are disposed proximate the second shaft first end 112 and extend towards the second shaft second end 114 along the steering column axis 22.

The plurality of second engagement elements 116 are arranged to selectively engage the plurality of first engagement elements 70. The plurality of second engagement elements 116 engage the plurality of first engagement elements while the steering column assembly 20 is in the extended position (un-stowed position), as shown in FIG. 1. The plurality of second engagement elements 116 are spaced apart from the plurality of first engagement elements 70 while the steering column assembly 20 is in the retracted position (stowed position), as shown in FIG. 3.

The locking assembly 34 is received within at least one of the first shaft assembly 30 and the second shaft assembly 32. The locking assembly 34 is arranged to selectively decouple the first shaft 42 of the first shaft assembly 30 from the second shaft 82 of the second shaft assembly 32 in response to the steering column assembly 20 moving from the extended position (un-stowed position) towards the retracted position (stowed position). At least one of the steering wheel and the first shaft assembly 30 and/or the second shaft assembly 32 are in a non-rotating condition while the ADAS 10 is activated and the first shaft 42 of the first shaft assembly 30 is operatively decoupled from the second shaft 82 of the second shaft assembly 32.

The locking assembly 34 is arranged to selectively couple the first shaft 42 of the first shaft assembly 30 to the second shaft 82 of the second shaft assembly 32 in response to the steering column assembly 20 moving from the retracted position (stowed position) to the extended position (un-stowed position), as shown in FIG. 1. At least one of the steering wheel and the first shaft assembly 30 and/or the second shaft assembly 32 are in a rotatable condition when the ADAS 10 is deactivated and the first shaft 42 of the first shaft assembly 30 is operatively connected to the second shaft 82 of the second shaft assembly 32.

The locking assembly 34 allows at least one of the steering wheel and the first shaft assembly 30 and/or the second shaft assembly 32 to be maintained in a non-moving or non-rotating state, while maintaining the option to reengage a mechanical link between at least one of the first shaft 42 of the first shaft assembly 30 and the second shaft 82 of the second shaft assembly 32 and the vehicle road wheels, as shown in FIG. 3.

Referring to FIGS. 1-4, the locking assembly 34 includes a shaft sleeve 120 and a jacket sleeve 122.

The shaft sleeve 120 is disposed about the first shaft 42. The shaft sleeve 120 is disposed proximate the first shaft second end 68. The shaft sleeve 120 at least partially overlaps and extends beyond the first shaft second end 68.

The shaft sleeve 120 includes a ring body 130 having a ring inner surface 132 and a ring outer surface 134. The ring inner surface 132 and the ring outer surface 134 each axially extend between a ring first end 136 and a ring second end 138.

The ring body 130 of the shaft sleeve 120 defines a pocket 140 and a tab 142. The pocket 140 extends at least partially through the ring body 130 of the shaft sleeve 120. The pocket 140 extends from the ring outer surface 134 towards the ring inner surface 132. In at least one embodiment, the pocket 140 is configured as a counterbore. The tab 142 is spaced apart from the pocket 140. The tab 142 extends from the ring outer surface 134. The tab 142 extends along the ring outer surface 134 from the ring first end 136 towards the ring second end 138. The tab 142 includes a tapered portion 144 disposed proximate the ring second end 138.

The shaft sleeve 120 is provided with a position feature 146. The position feature 146 is disposed within the pocket 140. The position feature 146 may emit a signal that is detected by the sensor assembly 36. For example, the position feature 146 may be a magnet, a magnetic emitter, or the like that may emit a magnetic field or other field.

Figure 4:
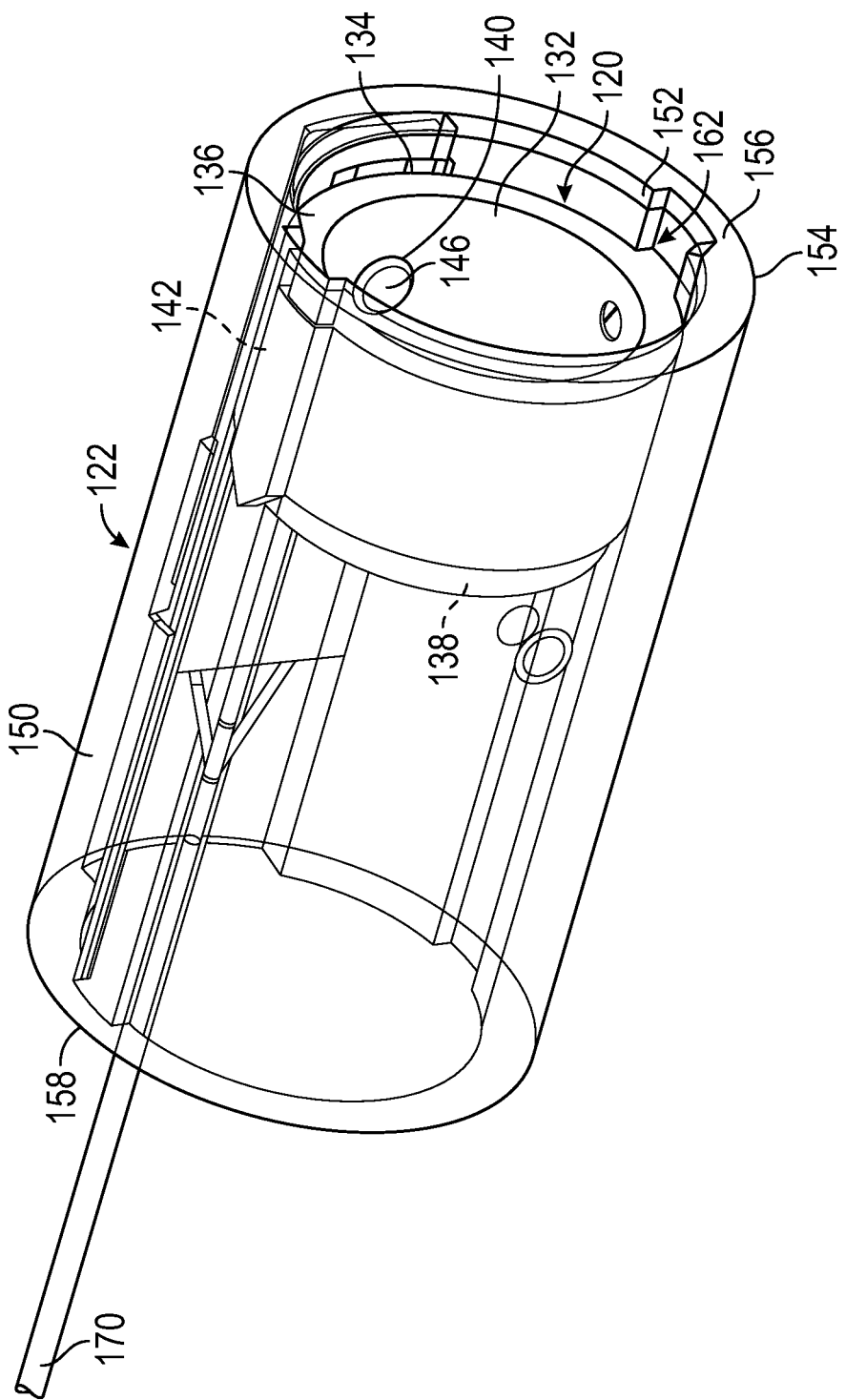
FIG. 4 is a perspective view of the locking assembly provided with the steering assembly in the stowed position.

The jacket sleeve 122 is disposed within the second jacket 26. The jacket sleeve 122 is disposed on the second jacket inner surface 92. The jacket sleeve 122 is spaced apart from the second shaft 82. The jacket sleeve 122 is configured to receive the shaft sleeve 120 as the steering column assembly 20 moves from the extended position (un-stowed position) towards the retracted position (stowed position), as shown in FIGS. 3 and 4.

The jacket sleeve 122 includes a hollow elongate body 150 having a jacket sleeve inner surface 152 that is disposed opposite a jacket sleeve outer surface 154. The jacket sleeve inner surface 152 and the jacket sleeve outer surface 154 each extend between a jacket sleeve first end 156 and a jacket sleeve second end 158 along the steering column axis 22.

The jacket sleeve 122 defines a window 160 and a slot 162. The window 160 extends through the hollow elongate body 150 of the jacket sleeve 122. The window 160 extends from the jacket sleeve outer surface 154 to the jacket sleeve inner surface 152. The window 160 is disposed between the jacket sleeve first end 156 and the jacket sleeve second end 158.

The slot 162 extends from the jacket sleeve inner surface 152 towards the jacket sleeve outer surface 154. The slot 162 extends from the jacket sleeve first end 156 towards the jacket sleeve second end 158. The slot 162 is configured to receive the tab 142 of the shaft sleeve 120 as the steering column assembly 20 moves from the extended position (un-stowed position) towards the retracted position (stowed position), as shown in FIGS. 3 and 4.

The shaft sleeve 120 engages and is at least partially received within the jacket sleeve 122 in response to activation of the ADAS 10. The shaft sleeve 120 moves towards the jacket sleeve 122 in response to the steering column assembly 20 moving from the extended position towards the retracted position. The initial engagement and at least partial reception of the shaft sleeve 120 within the jacket sleeve 122 begins the disengagement process between the plurality of first engagement elements 70 of the first shaft 42 of the first shaft assembly 30 and the plurality of second engagement elements 116 of the second shaft 82 of the second shaft assembly 32. The further reception of the shaft sleeve 120 within the jacket sleeve 122 disengages the plurality of first engagement elements 70 of the first shaft 42 of the first shaft assembly 30 from the plurality of second engagement elements 116 of the second shaft 82 of the second shaft assembly 32.

During a vehicle impact event, while the steering column assembly 20 is in the extended position (un-stowed position) and the first shaft 42 of the first shaft assembly 30 is operatively connected to the second shaft 82 of the second shaft assembly 32, the steering column assembly 20 may collapse such that the first shaft assembly 30 is translated relative to the second shaft assembly 32. The translation of the first shaft assembly 30 relative to the second shaft assembly 32 along the steering column axis 22 results in the shaft sleeve 120 being received within the jacket sleeve 122 to decouple the first shaft 42 of the first shaft assembly 30 from the second shaft 82 of the second shaft assembly 32 and collapse the steering column assembly 20 to absorb or dissipate kinetic energy.

Referring to FIGS. 1 and 3, the sensor assembly 36 is disposed within the second jacket 26. The sensor assembly 36 is arranged to be configured to detect a position of the position feature 146 relative to the sensor assembly 36 to provide position sensing feedback to the ADAS 10 or a vehicle controller.

Figure 5:
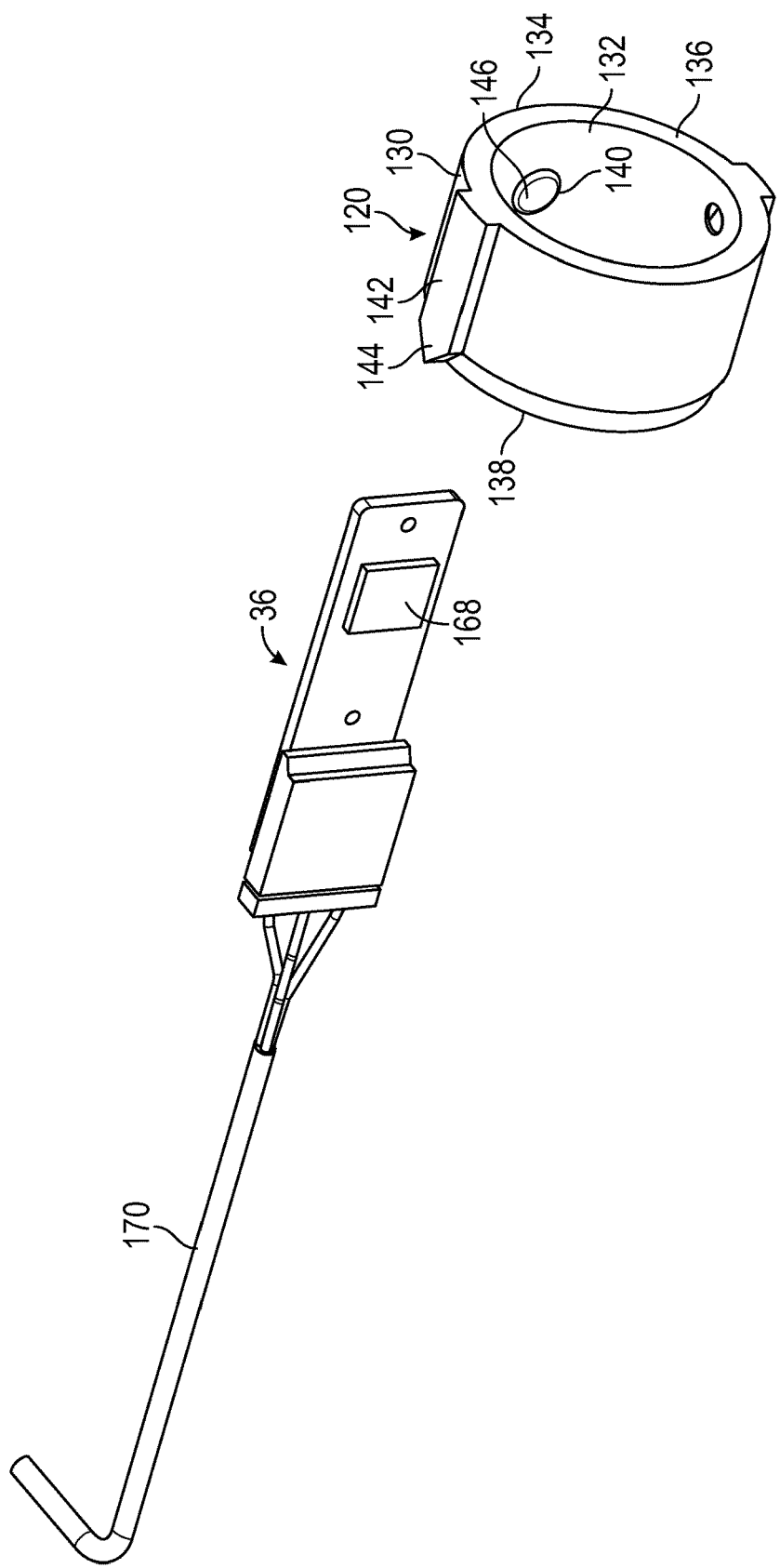
FIG. 5 is a perspective view of a sensor assembly and a shaft sleeve of the locking assembly.

Referring to FIGS. 1-4, the sensor assembly 36 is at least partially received within the window 160 of the jacket sleeve 122 such that the jacket sleeve 122 is provided with the sensor assembly 36. Referring to FIG. 5, the sensor assembly 36 includes a sensor 168 that may be a circuit card assembly, magnetic flux sensor, a Hall Effect sensor, a non-contacting sensor, or the like. The sensor assembly 36 provides a signal indicative of the steering column assembly 20 being in the stowed position based on the position feature 146 being disposed proximate the sensor assembly 36 while the shaft sleeve 120 is at least partially received within the jacket sleeve 122. For example, the position feature 146 may pass underneath a portion of the sensor assembly 36 and the sensor assembly provides a signal to the ADAS 10 or a vehicle controller indicative of the steering column assembly 20 being in the retracted position (stowed position).

The sensor assembly 36 includes a wire harness or a lead 170 that extends from the sensor assembly 36. The lead 170 extends through the opening 100 of the second jacket 26. In at least one embodiment, the lead 170 may be disposed substantially parallel to the second shaft 82 and exit through the second jacket second end 98.

Multiple sensor assemblies may be provided to provide additional position sensing feedback of the steering column assembly 20. The multiple sensor assemblies may provide at least a first signal and a second signal. The first signal may be indicative of the steering column assembly 20 being in the retracted position (stowed position) based on the position feature 146 being disposed proximate the sensor assembly 36 while the shaft sleeve 120 is at least partially received within the jacket sleeve 122. The second signal may be indicative of the steering column assembly 20 being in or moving towards the extended position (un-stowed position) based on the position feature 146 being spaced apart from the sensor assembly 36 while the shaft sleeve 120 is not received within the jacket sleeve 122.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A steering assembly provided with an autonomous or a semiautonomous vehicle, comprising:
    a steering column assembly movable between a stowed position and an unstowed position, the steering column assembly, comprising:
        a first shaft at least partially received within a first jacket,
        a second shaft at least partially received within a second jacket, the second shaft being selectively coupled to the first shaft, and
        a locking assembly received within at least one of the first jacket and the second jacket, the locking assembly being arranged to selectively decouple the first shaft from the second shaft in response to the steering column assembly moving from the unstowed position towards the stowed position.

2. The steering assembly of claim 1, wherein the locking assembly, comprising:

a shaft sleeve disposed about the first shaft, the shaft sleeve being provided with a position feature; and a jacket sleeve disposed within the second jacket, the jacket sleeve being provided with a sensor assembly configured to detect a position of the position feature.

3. The steering assembly of claim 2, wherein the jacket sleeve is spaced apart from the second shaft.

4. The steering assembly of claim 2, wherein the shaft sleeve is at least partially received within the jacket sleeve as the steering column assembly moves from the unstowed position towards the stowed position.

5. The steering assembly of claim 4, wherein the sensor assembly provides a signal indicative of the steering column assembly being in the stowed position based on the position feature being disposed proximate the sensor assembly while the shaft sleeve is at least partially received within the jacket sleeve.

6. The steering assembly of claim 4, wherein the position feature is a magnetic emitter disposed on the shaft sleeve.

7. The steering assembly of claim 6, wherein the sensor assembly is at least one of a magnetic flux sensor and a hall effect sensor.

8. The steering assembly of claim 1, wherein an inner surface of the first shaft is provided with a plurality of first engagement elements.

9. The steering assembly of claim 8, wherein an outer surface of the second shaft is provided with a plurality of second engagement elements.

10. The steering assembly of claim 9, wherein the plurality of first engagement elements are spaced apart from the plurality of second engagement elements while the steering column assembly is in the stowed position.

11. A steering column assembly, comprising:
a first jacket disposed about a first shaft;
a second jacket that is at least partially received within the first jacket, the second jacket being disposed about a second shaft that is selectively coupled to the first shaft; and
a locking assembly, comprising:
a shaft sleeve disposed about the first shaft having a position feature, and
a sensor assembly disposed within the second jacket and operatively connected to a jacket sleeve, the sensor assembly arranged to detect a position of the position feature relative to the sensor assembly.

12. The steering column assembly of claim 11, wherein the first shaft is movable relative to the second shaft.

13. The steering column assembly of claim 11, wherein the jacket sleeve defines a window that extends through jacket sleeve.

14. The steering column assembly of claim 13, wherein the sensor assembly is at least partially received within the window.

15. The steering column assembly of claim 11, wherein the jacket sleeve defines a slot that extends from a jacket sleeve inner surface towards a jacket sleeve outer surface.

16. The steering column assembly of claim 15, wherein the shaft sleeve defines a pocket that extends at least partially through the shaft sleeve.

17. The steering column assembly of claim 16, wherein the position feature is disposed within the pocket.

18. The steering column assembly of claim 16, wherein the shaft sleeve includes a tab that extends from an outer surface of the shaft sleeve.

19. The steering column assembly of claim 18, wherein the tab is configured to be received within the slot.

20. The steering column assembly of claim 19, wherein while the shaft sleeve is at least partially received within the jacket sleeve, the first shaft becomes decoupled from the second shaft.

* * * * *